United States Patent
Wittebrood et al.

(10) Patent No.: US 6,610,247 B2
(45) Date of Patent: Aug. 26, 2003

(54) ALUMINUM BRAZING ALLOY

(75) Inventors: Adrianus Jacobus Wittebrood, Velserbroek (NL); Achim Bürger, Hoehr-Grenzhausen (DE); Klaus Vieregge, Nauort (DE); Job Anthonius Van Der Hoeven, Haarlem (NL); Scott W. Haller, Richmond, VA (US)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 10/143,094

(22) Filed: May 13, 2002

(65) Prior Publication Data

US 2003/0082068 A1 May 1, 2003

Related U.S. Application Data

(63) Continuation-in-part of application No. 10/141,133, filed on May 9, 2002, and a continuation-in-part of application No. 09/713,297, filed on Nov. 16, 2000, now abandoned.
(60) Provisional application No. 60/221,959, filed on Jul. 31, 2000.

(30) Foreign Application Priority Data

Nov. 17, 1999 (EP) .............................. 99203824

(51) Int. Cl.[7] .............................. C22C 21/00
(52) U.S. Cl. ................. 420/548; 420/551; 420/553
(58) Field of Search ................. 420/540, 548, 420/551, 553

(56) References Cited

FOREIGN PATENT DOCUMENTS

| EP | 0637481 | 2/1995 |
|---|---|---|
| GB | 2321869 | 8/1998 |
| JP | 59085837 | 5/1984 |
| JP | 1195263 | 8/1989 |
| JP | 01-195263 A * | 8/1989 |
| JP | 3134127 | 6/1991 |
| JP | 03-134127 A * | 6/1991 |
| JP | 3134128 | 6/1991 |
| JP | 6306519 | 11/1994 |
| JP | 07-090444 A * | 4/1995 |
| WO | 9718946 | 5/1997 |

OTHER PUBLICATIONS

Althoff, J., "Aluminum alloy 3009; high strength without magnesium", Light Met. Age (1980), 38 (11–12), 20–1, XP002134979.

Althoff, J. et al, "Properties and use of a new aluminum-manganese–silicon alloy" Metall (Berlin)(1979), 33(6), 589–92.

J. van der Hoeven, A. Wittebrood, A. Bürger, K. Vieregge, A. Haszler and S. Haller, "Development of a High Strength Fin Stock Aluminium Alloy", May 14–17, 2001 in the USA.

Metals Handbook: Desk Edition, 2nd edition, Davis, J. R., ASM International, (1998), pp 445–448.*

* cited by examiner

*Primary Examiner*—Roy King
*Assistant Examiner*—Janelle Combs Morillo
(74) *Attorney, Agent, or Firm*—Stevens, Davis, Miller & Mosher, LLP

(57) ABSTRACT

The invention relates to an aluminium brazing alloy, ideally suitable as fin stock material, having the composition, in weight %: Si 0.4–1.0, Mn 0.7–1.2, Mg up to 0.10, Fe up to 0.8, Zn up to 3.0, Ni 0.5–0.9, Cu up to 0.15, optionally one or more selected from the group consisting of Ti up to 0.20, In up to 0.20, Zr up to 0.25, V up to 0.25 and Cr up to 0.25, other elements up to 0.05 each, up to 0.15 in total, Al balance.

37 Claims, No Drawings

ALUMINUM BRAZING ALLOY

CROSS REFERENCE TO RELATED APPLICATION

This is a continuation in part of U.S. patent application Ser. No. 09/713,297, filed Nov. 16, 2000, and is a continuation in part of U.S. patent application Ser. No. 10/141,133, filed May 9, 2002, which both claim priority from U.S. provisional application Ser. No. 60/221,959, filed Jul. 31, 2000, all of which are incorporated herein by reference in their entirety.

FIELD OF THE INVENTION

The invention relates to an aluminium alloy, which alloy can be used for heat exchangers. Ideally the aluminium alloy according to the invention is provided as fin stock material for heat exchanger devices. Furthermore, the invention relates a brazed assembly in the form of a brazed heat exchanger comprising at least one component of the aluminium alloy according to this invention.

DESCRIPTION OF THE RELATED ART

In the prior art, aluminium alloys are the alloys of choice for heat exchanger applications. These alloys are selected for their desirable combination of strength, low weight, good thermal and electrical conductivity, brazeability, corrosion resistance, and formability.

An aluminium alloy heat exchangers can be fabricated by stacking aluminium alloy clad sheets (brazing sheet), which have been formed to a desired configuration, so as to form fluid passages (tubes) and securing corrugated aluminium alloy fins between fluid passages by brazing. The bonding between the alloy clad sheets or the tube material and fins is achieved by melting the brazing filler metal of the core plates and/or fin material. As a brazing method, typically vacuum brazing or flux brazing is being applied. In an effort to improve the corrosion resistance of the fluid passage materials, some fin materials may be used which are electrochemically anodic (less noble) relative to the fluid passage material by the sacrificial anode effect of these fin materials.

Some disclosures of aluminium brazing sheet alloys found in the prior art literature will be mentioned below.

The publication by J. Althoff, in the technical journal Light Metal Age, December, 1980, pp. 20–21, "Aluminium Alloy 3009: High Strength Without Magnesium", discloses the 3009 alloy without magnesium. The 3009 alloy has the following composition, in weight percent:

| | |
|---|---|
| Si | 1.0–1.8 |
| Fe | max. 0.7 |
| Cu | max. 0.10 |
| Mn | 1.2–1.8 |
| Mg | max. 0.01 |
| Cr | max. 0.05 |
| Ni | max. 0.05 |
| Zn | max. 0.05 |
| Zr | max. 0.10 |
| Ti | max. 0.10 | others each max. 0.05, total max. 0.15
balance aluminium,
and further has the proviso that Si:Fe should be 2:1 to 4:1, and that Mn+Si should be in the range of 2.5–3.5.

The disclosed alloy may replace the known AA3003 alloy, and may be used for brazing applications.

EP-A-0637481 (Furukawa) discloses an aluminium alloy brazing sheet having a three-layer structure clad one side of the core material with a brazing material and clad of the other side of the core material with a sacrificial material. The defined core material has a very wide compositional window, in weight percent:

| | |
|---|---|
| Si | 0.6–2.5 |
| Cu | 0.5–2.5 |
| Mn | up to 2.0 | at least one kind selected from the group consisting of:

| | |
|---|---|
| Mg | 0.03–0.5 |
| Cr | 0.03–0.3 |
| Zr | 0.03–0.3 |
| Ti | 0.03–0.3 |
| Ni | 0.03–1.5 | balance aluminium and impurities.

This document further discloses an aluminium alloy brazing sheet having a three-layer structure cladded on both sides of the core material with a brazing material and whereby the core material has a very wide compositional window, in weight percent:

| | |
|---|---|
| Si | 0.03–2.5 |
| Fe | 0.05–2.0 |
| Cu | 0.05–2.0 |
| Mn | 0.6–2.0 | at least one kind selected from the group consisting of:

| | |
|---|---|
| Zn | 0.05–5.0 |
| In | 0.002–0.3 |
| Sn | 0.002–0.3 | balance aluminium and inevitable impurities.

There is a market demand in the automotive industry for aluminium alloys which alloys may be used for application in heat exchangers, and which alloys have improved post-brazed strength in combination with a good corrosion resistance. Further, there is a demand for fin stock alloy or aluminium braze product having a melting point or solidus temperature of the material greater than the current commercially available brazing process for which it will be applied, whereby both vacuum and controlled atmosphere brazing ("CAB") presently use aluminium alloys containing high levels of silicon with melting temperatures ranges from about 555 to 610° C. Furthermore, there is a demand from the side of the manufacturers of such aluminium alloys, for alloys having a tolerance for impurity elements from a recycling point of view without compromising to the required balanced properties of such an aluminium alloy.

SUMMARY OF THE INVENTION

It is an object of the present invention to provide an aluminium alloy which can be used for heat exchangers having an improved post-braze 0.2% yield strength over conventional alloys for the same application. It is another object of the present invention to provide an aluminium alloy having an improved tolerance for impurity elements. It is a further object of the present invention to provide an aluminium alloy which alloy is ideally suitable for providing fin stock material for heat exchanger devices, and having a solidus temperature of greater than about 610° C.

In one aspect the invention provides an aluminium alloy having the composition, in weight percent:

| | |
|---|---|
| Si | 0.4–1.0 |
| Mn | 0.7–1.2 |
| Mg | up to 0.10 |
| Fe | up to 0.8 |
| Zn | up to 3.0 |
| Ni | 0.5–0.9 |
| Cu | up to 0.15 |
| Ti | up to 0.20 |
| In | up to 0.20 |
| Zr | up to 0.25 |
| V | up to 0.25 |
| Cr | up to 0.25 | others up to 0.05 each, up to 0.15 in total

| | |
|---|---|
| Al | balance. |

This aluminium alloy has a good corrosion resistance, which includes the sacrificial anode effect where required, in combination with good mechanical properties in the post-brazing state and is capable of providing an increase in post-braze 0.2% yield strength (PS) of at least 15% over conventional finstock alloys, such as AA3003 in the same temper. The aluminium alloy in accordance with the invention is capable of achieving a post-braze 0.2% yield strength (PS) of at least 55 MPa, and in the best examples of at least 60 MPa. Furthermore, the aluminium alloy has after hot and/or cold rolling a desirable solidus temperature or melting temperature of 610° C. or higher.

Although this aluminium alloy can be used for tube plate, side supports and header tanks in heat exchanger units, and may have other uses, it is primarily intended as a rolled finstock alloy for heat exchangers. The corrosion demand for finstock is such that if the heat exchanger unit is attacked by corrosion, the fin material is preferentially attacked and not the tube material. The aluminium alloy according to this invention has this sacrificial anode effect. The aluminium alloy can be stronger, so the rolled finstock can be thinner and lighter than conventional finstock alloys, such as AA3003 alloys. The aluminium alloy of the invention used as finstock material may be used in combination with a cladding of a brazing alloy, e.g. an Al—Si alloy known in the art or other similar Al—Si systems alloys, such as Al—Si—Mg alloy, Al—Si—Mg—Bi alloy, Al—Si—Bi alloy or the like.

The heat exchanger market, particularly in the automotive industry, requires that finstock alloys offer a balance of properties, i.e. strength, formability, brazeability, corrosion potential and high solidus temperature. Our present evaluations have shown that the Si, Mn, Ni, Cu and Mg levels must be controlled and are key to the overall balanced performance of the materials. One of the key features of the novel alloy of this invention is the relatively high Si content as compared to AA3003 alloys, in combination with a medium Mn content. Consequently this increases the post-braze strength, by more than 15% relative to conventional finstock alloys. The aluminium alloy exhibits amongst other features excellent brazeability properties in combination with a high solidus temperature of 610° C. or higher.

The reasons for the limitations of the important alloying and other elements of the aluminium alloy according to the present invention are described below. Unless mentioned otherwise, all composition percentages are by weight.

Si is an important alloying element in the alloy according to this invention. The addition of Si results in an increased solution hardening of the alloy. Below 0.4% there is only little effect of the Si, and above 1.0% it may result in the formation of detrimental low-melting eutectics and also in the formation of large intermetallic particles. A more suitable range for the Si content is 0.65 to 1.0%, and more preferably in the range of 0.70 to 0.95%. In many aluminium alloys a Si-level at a medium range is conventionally regarded as detrimental. An advantage of this medium range Si-content is that the aluminium alloy has a tolerance for impurity elements, and allows the alloy to be composed from large amounts of scrap material. In combination with the Ni, Mg and Cu in the defined ranges, the Si is deemed to be responsible for the desirable high solidus temperature of the rolled product form. Preferably the sum of Si+Mn is in the range of 1.5–2.0, and more preferably in the range of 1.65–1.90, and allows for a good compromise in desired properties of the aluminium alloy such as post-braze strength and sag-resistance, while the aluminium alloy can be manufactured without great difficulties from scrap material.

Mn is also an important alloying element in the alloy according to this invention. The addition of Mn in a medium range of 0.7 to 1.2%, and whereby a more preferred lower limit for the Mn content is 0.8%. A more preferred upper limit for the Mn content is 1.1%. Also, more preferably the Mn should be in the range of 0.8 to 1.0%. A very high Mn content might lead to the detrimental formation of large Fe—Mn intermetallics. To allow for the aluminium alloy to be composed of large amounts of scrap, which might contain relatively high Fe contents, the Mn level should not exceed 1.2%. Above 1.2% Mn the casting of an ingot becomes more difficult.

Mg may increase the strength of the alloy significantly, but has a detrimental influence on controlled atmosphere brazeability because it tends to interact with the flux applied and reduces the materials' braze performance. Thus where the aluminium alloy according to the invention is being used is a flux brazing process, such as for example the NOCOLOK (trade name) brazing, the Mg is not added deliberately to the aluminium alloy in order to improve on the brazeability. The maximum for Mg-level is then 0.10%, and a preferred maximum is 0.05%, and more preferably the Mg content is less than 0.01% to allow the rolled alloy product to have a sufficiently high solidus temperature when the Si, Ni and Cu are within the ranges of the present invention.

Fe is present in all commercially known aluminium alloys. With a too high Fe content among other things the formability of the material decreases and also the corrosion performance is decreasing. The admissible Fe content is 0.8% maximum, and preferably 0.5% maximum. Such relatively high Fe contents may be tolerated by limiting the Mn content. A suitable Fe content is in the range of 0.20 to 0.45%, and more preferably in the range of 0.22 to 0.45%, and allows for a good compromise in desired properties of the alloy such as post-braze strength and sag-resistance, while the alloy can be manufactured without great difficulties from scrap material.

The addition of Zn leads to a more electronegative corrosion potential. To allow for the sacrificial anode effect, the fin material should be more electronegative as the tube material. Since different types of tube material can and will be used in heat exchangers, the Zn content can be used to tune the corrosion potential of the alloy of this invention to fit to the tube material. The Zn content should be at a level below 3.0% to avoid a too rapid corrosion attack of the fin material. Since Zn may be tolerated up to 3.0%, and preferably up to 2.5%, this achieves an advantage in the tolerance of this alloy for impurity elements, and allows this alloy to be composed from large amounts of scrap material, such as for example discarded heat exchangers. A suitable lower limit for the Zn-level is 0.2%. It has been found for the aluminium alloy according to this invention having such low Cu, low Mg, and medium range Si-levels, that zinc levels in a range of up to 3.0% have no significant effect on the solidus temperature of the rolled fin stock material.

An important aspect of the present invention is that the nickel content in the rolled aluminium alloy is in the range of 0.5 to 0.9%, and preferably in the range of 0.5 to 0.75%, thereby achieving high post-braze strength properties, good corrosion resistance and a solidus temperature of greater than 610° C. For example, it has been found in our experiments that in fin alloys otherwise meeting the composition according to the invention, but having a too high Ni content, for example 1.0% or more, that at least the sag-resistance as measured at 600° C. was very poor and had no commercial relevance. Together with the moderate Si levels, and low Cu and Mg levels, the Ni is key to obtain the balance in the desirable high solidus temperature of the rolled product, and also for obtaining the improvement in post-braze strength without resulting in a significant loss in thermal conductivity, allowing the fin alloy to be sacrificial or protective of other aluminium components in a brazed assembly, and good brazing performance.

Cu can be included as a strengthening component in aluminium alloys. However, it has been found that the Cu-levels should be kept low in order to avoid a too low melting point or solidus temperature of the rolled product to be applied in commercial brazing processes. The Cu-level is maintained at 0.15% maximum, or preferably at 0.05% or less, and most preferably maintained at a level of less then 0.03%, to maintain a sufficiently high solidus temperature when the Si, Ni and Mg are within the ranges of the present invention. In addition the Cu is maintained at these levels to insure that the corrosion potential of the material is less noble than the aluminium tube or plate alloys that it will be joined with, thereby allowing a fin alloy to be sacrificial or protective of the other components of a brazed assembly.

Ti may be present up to 0.20% to act preferably as a grain refining additive during the casting of a rolling ingot of the alloy of the invention. Additional Ti may be added, for example due to their presence in scrap material, in order to increase the strength of the alloy by solubility hardening. The total amount of Ti present in the alloy should not exceed 0.20%, but preferably is less than 0.15%.

The element Indium in a range of up to 0.2% may be added to the aluminium alloy of the invention in order to reach a more electro-negative corrosion potential. Furthermore, it has been found in accordance with the invention that in this aluminium alloy In is much more effective in reducing the corrosion potential of the alloy as compared to zinc additions. Typically 0.1% In is as effective as 2.5% Zn. Zinc and indium addition can be used in combination with each other. When added as a deliberate alloying element a more preferred range for In is 0.01 to 0.10%.

Zr in a range of up to 0.25% may be added to the alloy of this invention in order to further improve the strength of the alloy in the post-braze condition. Further, this element may be tolerated as an impurity element without deteriorating the desired properties of the alloy. A more suitable Zr addition is in the range of 0.05 to 0.20, and more preferably in the range of 0.05 to 0.15%.

Cr in a range of up to 0.25% may be added to the alloy of this invention in order to further improve the strength of the alloy in the post-braze condition. In case Cr is added, a preferred range for this element is in the range of 0.01 to 0.17%, and more preferably in the range of 0.06 to 0.14%.

Other components including tin and vanadium may be tolerated in the alloy according to the invention in a range up to 0.25%, preferably up to 0.15%, and more preferably up to 0.05%, and most preferably up to 0.005%. The total of these elements should not exceed 0.30%, and preferably it should not exceed 0.15%. Optionally such element may be present to reduce the corrosion potential of the alloy, and V has further the potential of increasing post-braze strength.

The balance is made by aluminium and unavoidable impurities, typically each up to 0.05% maximum, and in total 0.15% maximum.

In another aspect of the invention there is provided a brazed assembly, typically a heat exchanger, comprising the aluminium alloy of the invention as fin stock material. In such a heat exchanger having the aluminium alloy of the invention as fins, the fins may typically act as a sacrificial anode. The aluminium alloy according to the invention may also be clad on one or both of its surfaces. The purpose of such a cladding is essentially to provide the brazing material for the fillets, and is used for example in the case of unclad tubes like tubes for condensers made from extruded tubes or for serpentine type evaporators. Typically each clad layer thickness is in the range of 2 to 15% of the total thickness of the clad product. The composition of the clad layer is typically in the range of 5 to 15% Si, optionally up to 2.0% Mg, optionally up to 3.0% Zn, and optionally up to 0.2% Bi.

The aluminium alloy in accordance with the invention will now be illustrated by non-limitative and comparative examples.

EXAMPLE

On a laboratory scale of testing eight alloys have been cast with solidification rates in the same range as obtained with industrial scale DC casting. Although manufactured here on a laboratory scale of testing, the aluminium alloy in accordance with this invention can be manufactured using various standard industrial scale DC casting and continuous aluminium casting methods, followed by hot and/or cold rolling. The chemical compositions are listed in Table 1, where Alloys 1 and 2 are according to the invention, and the other alloys are for comparison and whereby Alloy 8 is the known AA3003 alloy commercially used as finstock material.

The cast ingots were preheated and hot rolled to a thickness of 5.7 mm. The sheets were then cold rolled to 1.5 mm and annealed at 360–400° C. for 2 hours before cold rolling to a final gauge of 1.0 mm. This is commonly known as the H14 temper.

The solidus temperatures of the materials have been measured in the material after hot rolling. The cold rolled sheets had the following mechanical properties (measured in accordance with ASTM B557, 1994 edition) after being subjected to a simulated brazing cycle (approx. 5 min at 590° C. and air cool), see Table 2. The mechanical properties are valid for non-clad material. However, for certain applications the aluminium alloy of the invention may be provided with a thin cladding, resulting in a small decrease of the mechanical properties (both in the pre- and post-braze conditions) of a few MPa, typically about 2 to 10 MPa. The post-braze corrosion potentials have been measured in accordance with ASTM G-69, and summarised in Table 2 also.

From these results it can be seen that the aluminium alloy of the invention has a significant improvement in mechanical properties over the conventionally used AA3003 alloy in the same temper, and offer the opportunity for down gauging of units prior to the brazing cycle and having a reduced rate of corrosion attack on the fin. From a comparison of Alloy 1 and 2 it can be seen that the addition of zinc to the alloy of the invention has little or no effect of the post-braze strength nor on the solidus temperature, but the addition of zinc does have an effect of the corrosion potential. Alloys 3 to 7 demonstrate that with relatively high Cu levels, and in dependence of the alloy having a high Si or Mg levels or low Ni levels, it appears that one could easily obtain an alloy having a too low solidus temperature, although the post-braze mechanical properties are at a sufficient high level. Furthermore, it can be seen that small difference in Si, Cu, Ni, Mg may result in significantly different solidus temperatures and significantly different corrosion potentials. Hence, it is clear the finding an appropriate balance in the alloying elements to achieve a balance in properties is very important but very difficult also.

TABLE 1

Chemical composition, in weight percent, of the aluminium alloys tested, the balance is aluminium and unavoidable impurities.

| Alloy | Si | Fe | Cu | Mn | Mg | Ni | Zn | Ti |
|---|---|---|---|---|---|---|---|---|
| 1 | 0.75 | 0.35 | 0.007 | 0.97 | 0.004 | 0.71 | 0.015 | 0.08 |
| 2 | 0.70 | 0.39 | 0.13 | 1.04 | 0.001 | 0.70 | 2.46 | 0.07 |
| 3 | 1.07 | 0.31 | 0.25 | 0.92 | 0.22 | 0.47 | 0.20 | 0.02 |
| 4 | 0.76 | 0.29 | 0.25 | 0.70 | 0.12 | 0.71 | 0.20 | 0.13 |
| 5 | 0.79 | 0.31 | 0.25 | 0.99 | 0.01 | 0.71 | 1.49 | 0.03 |
| 6 | 0.90 | 0.52 | 0.25 | 0.95 | 0.08 | 0.46 | 0.04 | 0.14 |
| 7 | 0.90 | 0.52 | 0.25 | 0.95 | 0.08 | 1.0 | 0.04 | 0.14 |
| 8 | <0.6 | <0.7 | 0.05–0.20 | 1.0–1.5 | <0.05 | — | <0.1 | <0.05 |

TABLE 2

Relevant properties of the alloys tested.

| Alloy | Solidus temperature (° C.) | Post-braze UTS (MPa) | Post-braze 0.2 PS (MPa) | Post-braze corrosion potentials (mV) |
|---|---|---|---|---|
| 1 | 614 | 142 | 65 | −735 |
| 2 | 612 | 143 | 61 | −818 |
| 3 | 596 | 152 | 67 | −724 |
| 4 | 604 | 161 | 69 | −741 |
| 5 | 605 | 161 | 67 | −716 |
| 6 | 602 | — | — | — |
| 7 | 601 | — | — | — |
| AA3003 | 642 | 109 | 42 | −719 |

Having now fully described the invention, it will be apparent to one of ordinary skill in the art that many changes and modifications can be made without departing from the spirit or scope of the invention as herein described.

What is claimed is:
1. An aluminium alloy having the composition, in weight percent:

| | |
|---|---|
| Si | 0.4–1.0 |
| Mn | 0.7–1.2 |
| Mg | less than 0.01 |
| Fe | up to 0.8 |
| Zn | up to 3.0 |
| Ni | 0.5–0.9 |
| Cu | less than 0.03 |
| Ti | up to 0.20 |
| In | up to 0.2 |
| Zr | up to 0.25 |
| V | up to 0.25 |
| Cr | up to 0.25 | impurity elements up to 0.05 each, and up to 0.15 in total,

| | |
|---|---|
| Al | balance. | wherein the aluminium alloy is in the form of fin stock material.

2. The aluminium alloy according to claim 1, wherein the Mn-level is in the range of 0.8 to 1.1%.

3. The aluminium alloy according to claim 1, wherein the Mn-level is in the range of 0.8 to 1.0%.

4. The aluminium alloy according to claim 1, wherein the Si-level is in the range of 0.65 to 1.0%.

5. The aluminium alloy according to claim 1, wherein the Si-level is in the range of 0.70 to 0.95%.

6. The aluminium alloy according to claim 1, wherein the Zr-level is in the range of 0.05 to 0.15%.

7. The aluminium alloy according to claim 1, wherein the Fe-level is in the range of up to 0.50%.

8. The aluminium alloy according to claim 1, wherein the Fe-level is in the range of 0.20 to 0.45%.

9. The aluminium alloy according to claim 1, wherein the Fe-level is in the range of 0.22 to 0.45%.

10. The aluminium alloy according to claim 1, wherein the Zn-level is at most 2.5%.

11. The aluminium alloy according to claim 1, wherein the Ti-level is up to 0.15%.

12. The aluminium alloy according to claim 1, wherein the In-level is in the range of 0.01 to 0.10%.

13. The aluminium alloy according to claim 1, wherein the Ni-level is from 0.5 to 0.75%.

14. The aluminium alloy according to claim 1, wherein the Zn-level is from 0.2 to 3.0%.

15. The aluminium alloy according to claim 1, wherein the Zn-level is from 0.2 to 2.5%.

16. The aluminium alloy according to claim 1, wherein the sum of the Si-level and the Mn-level is from 1.5 to 2.0%.

17. The aluminium alloy according to claim 1, wherein the sum of the Si-level and the Mn-level is from 1.65 to 1.90%.

18. The aluminium alloy according to claim 1, wherein the fin stock material is capable of obtaining a solidus temperature of 610° C. or higher.

19. A brazed heat exchanger having fins of the alloy according to claim 18.

20. The aluminium alloy according to claim 1, wherein the fin stock material is capable of obtaining a post-braze 0.2% yield strength of at least 55 MPa.

21. A brazed heat exchanger having fins of the alloy according to claim 20.

22. The aluminium alloy according to claim 1, wherein the fin stock material is capable of obtaining a post-braze 0.2% yield strength of at least 60 MPa.

23. A brazed heat exchanger having fins of the alloy according to claim 22.

24. A brazed heat exchanger having fins of the alloy according to claim 1.

25. A brazed heat exchanger having fins of an aluminium alloy having the composition, in weight percent,

| | |
|---|---|
| Si | 0.4–1.0 |
| Mn | 0.8–1.1 |
| Mg | less than 0.01 |
| Fe | up to 0.5 |
| Zn | up to 3.0 |
| Ni | 0.5–0.9 |
| Cu | less than 0.03 |
| Ti | up to 0.15 |
| In | up to 0.20 |
| Zr | up to 0.25 |
| V | up to 0.25 |
| Cr | up to 0.25 | impurity elements up to 0.05 each, and up to 0.15 in total,

| | |
|---|---|
| Al | balance; | and wherein said fins have a post-braze 0.2% yield strength of at least 55 MPa and have a solidus temperature of 610° C. or higher.

26. The brazed heat exchanger of claim 25, wherein the Si-level is in the range of 0.65 to 1.0%.

27. The brazed heat exchanger of claim 25, wherein the Si-level is in the range of 0.70 to 0.95%.

28. The brazed heat exchanger of claim 25, wherein the Mn-level is in the range of 0.8 to 1.0%.

29. The brazed heat exchanger of claim 25, wherein the Fe-level is in the range of 0.20 to 0.45%.

30. The brazed heat exchanger of claim 25, wherein the Fe-level is in the range of 0.22 to 0.45%.

31. The brazed heat exchanger of claim 25, wherein the In-level is in the range of 0.01 to 0.10%.

32. The brazed heat exchanger of claim 25, wherein the Mn-level is less than 1.2%.

33. The brazed heat exchanger of claim 25, wherein the Zn-level is in the range of 0.2 to 3.0%.

34. The brazed heat exchanger of claim 25, wherein the Zn-level is at most 2.5%.

35. The brazed heat exchanger of claim 25, wherein the Ni-level is from 0.5 to 0.75%.

36. A brazed heat exchanger having fins of an aluminium alloy consisting of, in weight percent,

| | |
|---|---|
| Si | 0.7–0.95 |
| Mn | 0.8–1.0 |
| Mg | less than 0.01 |
| Fe | up to 0.5 |
| Zn | up to 3.0 |
| Ni | 0.5–0.9 |
| Cu | less than 0.03 |
| Ti | up to 0.15 |
| In | up to 0.20 |
| Zr | up to 0.25 |
| V | up to 0.25 |
| Cr | up to 0.25 | impurity elements up to 0.05 each, and up to 0.15 in total,

| | |
|---|---|
| Al | balance; | and wherein said fins have a post-braze 0.2% yield strength of at least 55 MPa and have a solidus temperature of 610° C. or higher.

37. An aluminium alloy consisting of, in weight percent:

| | |
|---|---|
| Si | 0.7–0.95 |
| Mn | 0.7–1.1 |
| Mg | less than 0.01 |
| Fe | 0.2–0.45 |
| Zn | up to 3.0 |
| Ni | 0.5–0.9 |
| Cu | less than 0.03 |
| Ti | up to 0.15 |
| In | up to 0.20 |
| Zr | up to 0.25 |
| V | up to 0.25 |
| Cr | up to 0.25 | impurity elements up to 0.05 each, and up to 0.15 in total,

| | |
|---|---|
| Al | balance; | and wherein said alloy is in the form of fin stock material.

* * * * *

UNITED STATES PATENT AND TRADEMARK OFFICE
CERTIFICATE OF CORRECTION

PATENT NO. : 6,610,247 B2  Page 1 of 1
DATED : August 26, 2003
INVENTOR(S) : Adrianus Jacobus Wittebrood et al.

It is certified that error appears in the above-identified patent and that said Letters Patent is hereby corrected as shown below:

<u>Title page,</u>
Item [73], Assignees, should read -- Corus Aluminum Walzprodukte GmbH and Corus L.P. --

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,610,247 B2
DATED : August 26, 2003
INVENTOR(S) : Adrianus Jacobus Wittebrood et al.

It is certified that error appears in the above-identified patent and that said Letters Patent is hereby corrected as shown below:

Title page,
Item [73], Assignees, should read -- Corus Aluminium Walzprodukte GmbH and Corus L.P. --.

This certificate supersedes Certificate of Correction issued November 4, 2003.

Signed and Sealed this

First Day of November, 2005

JON W. DUDAS
*Director of the United States Patent and Trademark Office*